US008401830B2

(12) United States Patent  
Sarkkinen

(10) Patent No.: US 8,401,830 B2
(45) Date of Patent: Mar. 19, 2013

(54) METHOD AND DEVICE FOR PERFORMING CHANNEL SIMULATION

(75) Inventor: Timo Sarkkinen, Kempele (FI)

(73) Assignee: Elektrobit System Test Oy, Oulunsalo (FI)

( * ) Notice: Subject to any disclaimer, the term of this patent is extended or adjusted under 35 U.S.C. 154(b) by 648 days.

(21) Appl. No.: 11/795,047

(22) PCT Filed: Jan. 11, 2006

(86) PCT No.: PCT/FI2006/050016
§ 371 (c)(1),
(2), (4) Date: Mar. 31, 2008

(87) PCT Pub. No.: WO2006/075051
PCT Pub. Date: Jul. 20, 2006

(65) Prior Publication Data
US 2008/0270098 A1 Oct. 30, 2008

(30) Foreign Application Priority Data

Jan. 12, 2005 (FI) .................................... 20055016

(51) Int. Cl.
*G06G 7/48* (2006.01)
*G06F 17/50* (2006.01)
*G01S 13/00* (2006.01)
*G01S 7/40* (2006.01)

(52) U.S. Cl. ............... 703/4; 703/5; 703/13; 342/61; 342/73; 342/165; 342/168

(58) Field of Classification Search ................ 703/4, 5, 703/13; 342/61, 73, 165, 168
See application file for complete search history.

(56) References Cited

U.S. PATENT DOCUMENTS

| 4,317,214 | A | * | 2/1982 | Attinello .......................... 455/1 |
| 5,233,628 | A | * | 8/1993 | Rappaport et al. ............ 375/224 |
| 6,308,072 | B1 | | 10/2001 | Labedz et al. |
| 7,430,413 | B2 | | 9/2008 | Fleury et al. |

(Continued)

FOREIGN PATENT DOCUMENTS

| JP | 07046201 | 2/1995 |
| JP | 7177107 | 7/1995 |

(Continued)

OTHER PUBLICATIONS

"A Channel Access Scheme for Large Dense Packet Radio Networks" Shephard, Timothy J. Proceedings of ACM SIGCOMM'96, Aug. 1996, Stanford University, California.*

(Continued)

*Primary Examiner* — Omar Fernandez Rivas
*Assistant Examiner* — Nithya Janakiraman
(74) *Attorney, Agent, or Firm* — Hoffmann & Baron, LLP

(57) ABSTRACT

A method and a device are provided for performing channel simulation. The device includes a radio channel simulation block and a memory and it is configured to simulate a radio connection between a transmitter and a receiver in real time. The device is further configured to simulate a radio connection between at least one interfering signal source and the receiver in real time, and to store the simulation result in the memory, and to read the stored simulation results in real time from the memory and add the results read to the simulation during simulation of the radio connection between the transmitter and the receiver.

10 Claims, 2 Drawing Sheets

U.S. PATENT DOCUMENTS

Figure 1:
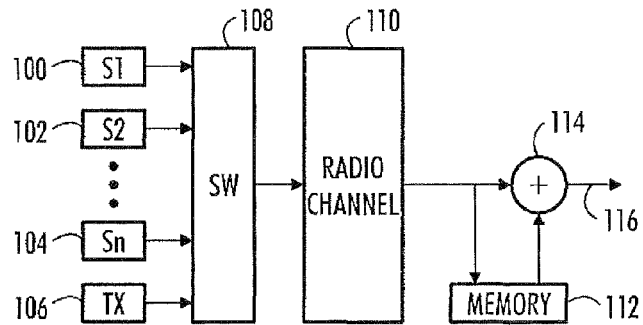

2003/0050020 A1    3/2003    Erceg et al.
2003/0088390 A1*   5/2003    Jamsa et al. .................. 703/5

FOREIGN PATENT DOCUMENTS

| JP | 10276103      |   | 10/1998 |
|----|---------------|---|---------|
| JP | 2001094502    |   | 4/2001  |
| JP | 2004064221    |   | 2/2004  |
| JP | 2004304302    | A | 10/2004 |
| JP | 2005509361    | T | 4/2005  |
| KR | 20010048715   | A | 6/2001  |

OTHER PUBLICATIONS

"A New Wideband High Frequency Channel Simulation System". Mastrangelo, et al. IEEE Transactions on Communications, Vol. 45, No. 1, Jan. 1997.*

Hagenauer et al., "The Maritime Satellite Communication Channel—Channel Model, Performance of Modulation and Coding", *IEEE Journal on Selected Areas in Communications*, vol. SAC-5, No. 4, pp. 701-713, May 1987.

Jämsä et al., "Real-time Simulation of Adaptive Array Antenna using Broadband Vector Channel Simulator", *The 5th International Symposium on Wireless Personal Multimedia Communications*, Oct. 27-30, 2002, Conference Proceedings vol. 1, IEEE 2002, ISBN 0-7803-7442-8, pp. 188-192.

Kolu et al., "A Real-Time Simulator for MIMO Radio Channels", *The 5th International Symposium on Wireless Personal Multimedia Communications*, 2002, Conference Proceedings vol. 2, pp. 568-572, Oct. 27-30, 2002, ISSN: 1347-6890.

* cited by examiner

METHOD AND DEVICE FOR PERFORMING CHANNEL SIMULATION

FIELD

The invention relates to a method and a device for implementing the method of simulating a radio channel. The invention particularly relates to the implementation of a multichannel radio channel simulator.

BACKGROUND

An essential problem in radio systems is the rapid variation of the properties of a radio channel as a function of time. This particularly relates to mobile telephone systems, wherein at least one of the parties to the connection is often mobile. This being so, the attenuation and the impulse response of the radio channel vary within a wide variation and amplitude range as many as thousands of times per second. The nature of the phenomenon is random, which enables statistical description thereof mathematically. In addition to an entirely statistical manner, other methods also exist, for instance geometrical methods or combinations of the aforementioned. The phenomena impair the design of radio connections and the devices to be employed.

There are many reasons for variation in a radio channel. During the transmission of a radio-frequency signal from a transmitter to a receiver, the signal propagates in the radio channel along one or more paths, in each of which the phase and amplitude of the signal vary, causing fadings of different duration and strength in the signal. In addition, noise and interference caused by other transmitters also interfere with the radio connection.

A radio channel can be tested either under real circumstances or with a simulator simulating real circumstances. Tests performed under real circumstances are difficult, since tests performed outside, for example, are subject to weather and the time of year, for example, which change all the time. Measurements made in the same place produce different results in different times. In addition, a test performed in one environment (city A) is not completely valid in another corresponding environment (city B). The basic problem is always that the tests are not repeatable, and the effects of the different factors cannot be tested separately. The worst possible situation cannot usually be tested under real circumstances.

The implementation of a real-time simulation requires much effect from the simulation equipment. Real-time simulation means that the simulation time corresponds to real time. Modelling a radio connection between a realistic transmitter and receiver most frequently requires that several signal propagation paths between the transmitter and the receiver are taken into account. In addition, if more than one antenna (MIMO, Multiple Input, Multiple Output) is employed in the transmitter and/or the receiver, the number of propagation paths required continues to increase. One propagation path including a plurality of parallel paths corresponds to one radio channel to be modelled. The number of channels employed in several known simulation devices is eight. If four antennas are employed in both the transmitter and the receiver, 16 channels are required in the simulation.

A special addition to the number of channels is caused by possible sources of interference, which also have to be taken into consideration in a realistic simulation.

Realistic simulations have been impossible to implement as such in any manner because of the complexity of the matter. Real channel models cannot be simulated, since the simulation of a simple MIMO implementation alone requires the use of the most efficient hardware simulators. At present, simulations on the link level have been performed only based on software by the use of very coarse approximations only. For example, the use of real channel models has not been possible in any manner.

BRIEF DESCRIPTION

An object of the invention is to implement a method and equipment for implementing the method in a manner enabling the performance of realistic real-time simulations. This is achieved by a method of performing channel simulation, in which method a radio connection between a transmitter and a receiver is simulated in real time. The method of the invention comprises simulating a radio connection between at least one interfering signal source and the receiver in real time and storing the simulation results in a memory, reading the stored simulation results in real time from the memory, and adding the results read to the simulation during simulation of the radio connection between the transmitter and the receiver.

The invention also relates to a device for performing channel simulation and comprising a radio channel simulation block and a memory, the device being configured to simulate a radio connection between a transmitter and a receiver in real time. The device is configured to simulate a radio connection between at least one interfering signal source and the receiver in real time, and to store the simulation result in the memory, and to read the stored simulation results in real time from the memory and add the results read to the simulation during simulation of the radio connection between the transmitter and the receiver.

A plurality of advantages is achieved with the method and device according to the invention. The solution enables an almost limitless increase in the number of channels to be simulated. The only factor restricting the simulation parameters is the capacity and speed of the memory, but the amount and speed of the memory can be increased according to the need.

The solution enables the performance of realistic simulations, which have not been practically implementable previously in any manner. The solution is suitable particularly for cases wherein a plurality of antennas or antenna elements is employed in the transmitter and/or the receiver.

LIST OF FIGURES

Figure 2A:
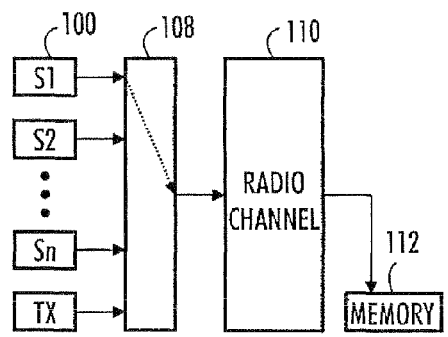
Figure 2B:
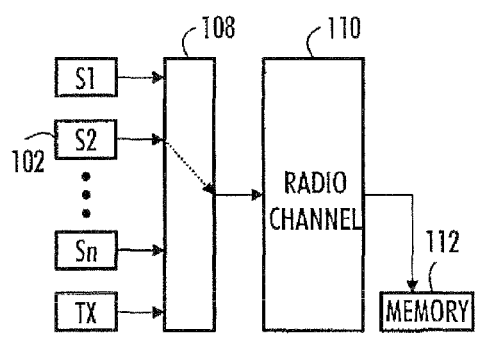
Figure 2C:
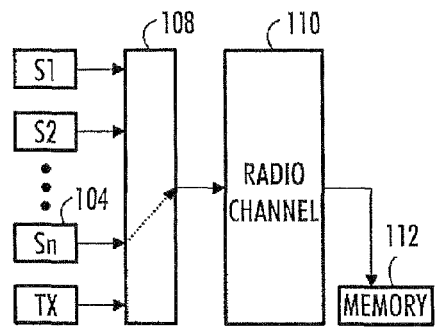
Figure 2D:
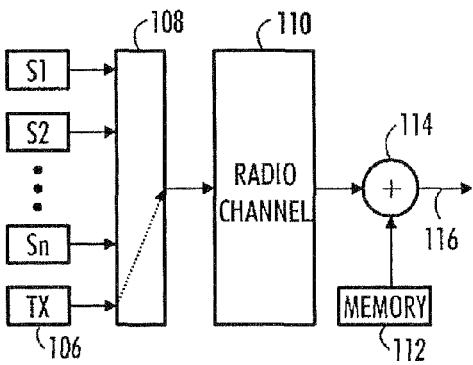
Figure 3:
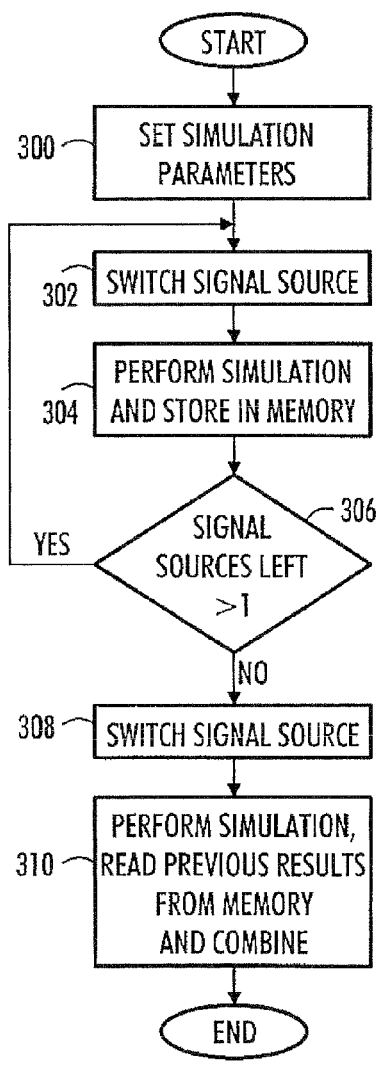
Figure 4A:
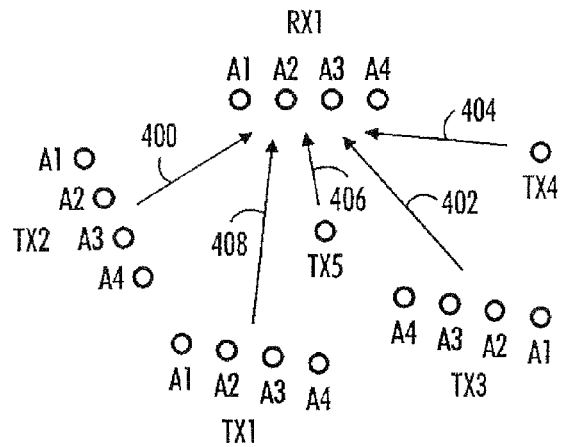
Figure 4B:
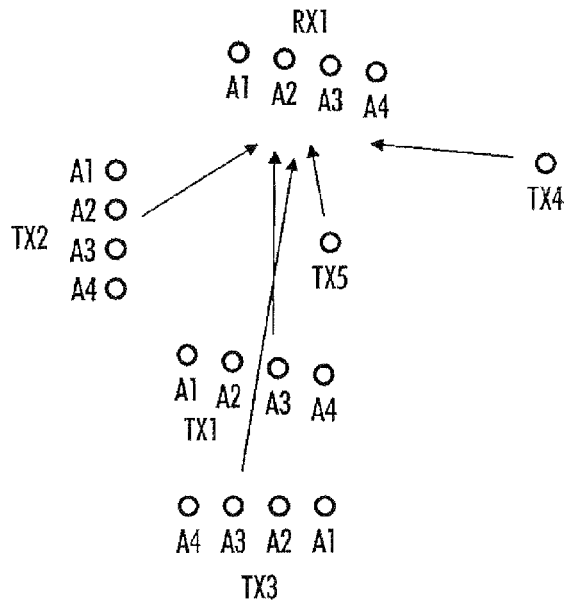

In the following, the invention will be described in more detail in connection with preferred embodiments with reference to the accompanying drawings, in which FIG. 1 shows an example of simulation equipment, FIGS. 2A to 2D illustrate an embodiment, FIG. 3 illustrates an embodiment by means of a flow diagram, and FIGS. 4A and 4B show an example of a simulation environment.

DESCRIPTION OF EMBODIMENTS

Referring to FIG. 1, an example of simulation equipment will be studied, whereto some embodiments of the invention can be applied. In this example, a receiver receives a signal from n interference sources 100 to 104, and the desired signal from a transmitter 106. Both the interference sources and the transmitter can be either external signal sources or they can be generated in a simulator.

The arrangement comprises a switch 108, by means of which the signal source to be simulated at each particular time is switched to a radio channel block 110, which simulates the effect of the radio channel on the signal of the signal source. A radio channel block is a device that tends to simulate everything that can happen to a signal between the transmitter and the receiver, such as reflections and fading. The switch may be controllable by means of software. The nature of the switch can also be logical and it can be implemented by means of time division, for example. From the radio channel block, the signal is applied either to a memory 112 or to an adder 114, the second input of which is a signal from the memory 112. An output signal 116 from the adder is applied to radio frequency parts in the receiver.

In the solution according to an embodiment of the invention, a radio connection between one or more interfering signal sources 100 to 104 and the receiver is simulated in real time and the simulation results are stored in the memory 112. Then, during simulation of a radio connection between the transmitter and the receiver, the stored simulation results are read in real time from the memory and the results read are added to the simulation. Let us study this embodiment by means of FIGS. 2A to 2D.

The first interfering signal source 100 is first switched in accordance with FIG. 2A via the switch 108 to the radio channel block 110, wherein the effect of the radio channel on the signal between the interfering signal source and the receiver is simulated in real time. The radio connection simulated may comprise a plurality of propagation paths to be simulated. From the radio channel block, the simulation results are applied to the memory 112.

Next, the second interfering signal source 102 is switched in accordance with FIG. 2B via the switch 108 to the radio channel block 110, wherein the effect of the radio channel on the signal between the interfering signal source and the receiver is simulated. The radio connection simulated may comprise a plurality of propagation paths to be simulated. From the radio channel block, the simulation results are applied to the memory 112, wherein the simulation results are combined, synchronized in time, i.e. synchronously, with the results stored previously.

In the same way, the interfering signal sources are switched to the radio channel block 110 in turn by means of the switch 108, until the last interfering signal source 106 is being calculated. The last, $n^{th}$ interfering signal source 102 is switched in accordance with FIG. 2C via the switch 108 to the radio channel block 110, wherein the effect of the radio channel on the signal between the interfering signal source and the receiver is simulated. From the radio channel block, the simulation results are applied to the memory 112, wherein the simulation results are combined, synchronized in time, i.e. synchronously, with all the results stored previously. Accordingly, at this point of time, the memory comprises the simulation results of all interfering signal sources 100 to 104.

Next, in accordance with FIG. 2D, the transmitter 104 is switched via the switch 108 to the radio channel block 110, wherein the radio channel between the transmitter and the receiver is simulated in real time. The simulation results are applied to the adder 114. As a second input, a signal arrives at the adder from the memory 112. In the adder, the simulation results of the interfering signal sources are added synchronously to the simulation result of the signal between the transmitter and the receiver. The final simulation results 116 are applied to the radio frequency parts of the receiver.

If a multichannel simulator is in use, a plurality of propagation paths can be simultaneously simulated during the simulation of each interference source and transmitter. Similarly, a plurality of signal sources can be simulated simultaneously and the results stored in real time in the memory 112.

In an embodiment, the switching of the transmitters and the performance of the simulation may be executed by means of suitable software. This being so, the signal produced by the signal source is generated either in real time or not in real time with a software tool, and it is run through the simulator in the same manner.

FIG. 3 illustrates an embodiment of the invention by means of a block diagram.

In step 300, the simulation parameters are set. This step comprises the selection and feed of the channel models, signal sources and other parameters used in the simulation, for example, into the simulator.

In step 302, the signal source is switched to the radio channel block.

In step 304, real-time simulation of the signal source is performed, and the simulation results are stored in the memory. If the memory includes stored results of signal sources simulated previously, the results are combined synchronously. This means that the results match each other in time.

In step 306, a check is made to determine if any signal sources to be simulated remain. If more than one signal source remains, step 302 is re-entered. If only one signal source remains, step 308 is entered.

In step 308, the last signal source to be simulated is switched to the radio channel block.

In step 310, the simulation of the signal of the last signal source is performed in the radio channel block. At the same time, the simulation results stored previously are read from the memory and these results are combined with the simulation performed in the adder at the same time. Accordingly, the simulation results of all signal sources are simultaneously at the output of the adder.

Let us assume, for example, that the intention is to simulate a radio channel between a transmitter and a receiver in a case when four antennas or antenna elements are employed in both the transmitter and the receiver. In other words, 4×4 MIMO is involved. Let us further assume that the intention is to check how five adjacent MIMO transmitters affect the situation. These five transmitters can be simulated in succession and the simulation results can be stored in the memory in the above-described manner. During the execution of the simulation, the same signal source, either internal or external to the simulator, can be used in the simulation of all five adjacent MIMO transmitters. This saves costs. For example, if the simulation time is 15 minutes, then the entire simulation takes 6×15, i.e. 90 minutes. This is a short time compared with a situation when the simulation is performed with a software-based simulator.

The number of signal sources to be simulated is not limited. The size of the memory employed should be selected sufficiently large. The memory can be implemented for instance with one or more hard discs, and the number of hard discs can be increased if need be. In connection with storing, data stored previously have to be read simultaneously, new simulation results have to be combined with previously stored results, and the combined results have to be stored. In an embodiment, two hard discs per receiver unit are used. One hard disc is employed for reading and the other for writing. In the next step, the functions of the hard discs are changed.

Let us next study the amount of memory required. Let us assume that the simulation time is 15 minutes, for example, and samples are calculated at the frequency 80 MHz in the simulation. The samples to be calculated are 16-bit and they are calculated separately for branches I and Q of the signal.

Accordingly, the amount of data to be stored is 288 GB at a speed of 320 MB/s. The highest data transfer speed of present hard discs is in the order of 150 to 600 MB/s depending on the interface type employed. Hard discs typically have a large (8 to 16 MB) internal cache memory, so the data transfer capacity required can be achieved by means of two hard discs.

In one embodiment, the final simulation results are stored also in the memory. This enables later utilization of the simulation results for testing the operation of the receiver, for example.

FIGS. 4A and 4B illustrate an example of a simulation environment, for whose simulation the solution presented is suitable. The figures show a transmitter TX1, and a receiver RX1 receiving a signal of the transmitter. Both the transmitter TX1 and the receiver RX1 employ four antennas or antenna elements. The figure also shows two terminals TX2 and TX3 that interfere with the connection between the transmitter TX1 and the receiver RX1. The terminals also employ four antennas or antenna elements. In addition, two transmitters TX4 and TX5, which use one antenna, are taken into consideration in the simulation. The receiver and all transmitters are able to move during the simulation. The directions, polarizations and other properties of the transmitted signals can be time-dependent. FIG. 4A illustrates the locations of the devices at point of time $t_0$. FIG. 4B illustrates the locations of the devices after some time, at point of time $t_1$. It is observed that the transmitters TX2, TX3 and the receiver RX1 have moved. TX1, TX4 and TX5 have not changes places as compared with point of time $t_0$.

Let us study an example of how the radio channel between the transmitter TX1 and the receiver can be simulated in the above-described environment. Let it be pointed out that the simulation order described is only an example of a feasible solution. The simulation may be started for instance by simulating a connection 400 between the interfering transmitter TX2 and the receiver RX1. Both devices employ four antennas or antenna elements, and thus the connection comprises 16 correlating channels, i.e. propagation paths. This can be simulated as a normal MIMO simulation. Accordingly, in the simulation, an antenna element A1 of RX1 receives a signal from all antenna elements of the transmitter TX2, as do all other antenna elements A2, A3 and A4 of the receiver RX1. Any movement of both the transmitter TX2 and the receiver RX1 is taken into consideration. The simulation results are stored in a memory.

Next, a connection 402 between the transmitter TX3 and the receiver RX1 is simulated. This simulation is similar to the previous step. The simulation results are stored in the memory synchronously with the simulation results of the previous step. Accordingly, the memory comprises the combined effect of the signals of the transmitters TX2 and TX3 in the receiver RX1.

Next, a connection 404 between the transmitter TX4 and the receiver RX1 is simulated. The transmitter TX4 employs one antenna, and thus the connection comprises 4 correlating channels. The simulation results are stored in the memory synchronously with the simulation results of the previous step. Accordingly, the memory comprises the combined effect of the signals of the transmitters TX2, TX3 and TX4 in the receiver RX1.

Next, a connection 406 between the transmitter TX5 and the receiver RX1 is simulated. The simulation can be implemented in a manner corresponding to that of the previous step, since the transmitter TX5 also employs one antenna. The simulation results are stored in the memory synchronously with the simulation results of the previous step. Accordingly, the memory comprises the combined effect of the signals of the transmitters TX2, TX3, TX4 and TX5 in the receiver RX1.

Finally, a connection 408 between the transmitter TX1 and the receiver RX1 is simulated. Both devices employ four antennas or antenna elements, and thus the connection comprises 16 correlating channels. During the simulation, the simulation results of the interference sources TX2, TX3, TX4 and TX5 are read from the memory and added to the simulation results of the connection. Consequently, in the final simulation, 56 parallel channels have been simulated.

It is to be noted that separate signal sources for the different transmitters are not necessarily required in the above-described arrangement. Since the simulation of the connections of the different transmitters occurs at different times, the same signal sources can be utilized in the simulation of the different transmitters. For example, all of the transmitters TX1, TX2 and TX3 can be simulated by using a similar signal source. Accordingly, the costs and the complexity of the simulation arrangement can be substantially reduced.

Although the invention is described above with reference to the example in accordance with the accompanying drawings, it will be appreciated that the invention is not to be so limited, but it may be modified in a variety of ways within the scope of the appended claims.

The invention claimed is:

1. A device for performing channel simulation comprising:
a radio channel simulation block; and
a memory,
wherein the device simulates a radio connection between a transmitter and a receiver in real time by coupling the transmitter to the radio channel simulation block and outputting first simulation results from the radio channel simulation block, the first simulation results representing a simulation of the radio connection between the transmitter and the receiver,
the device further simulating a radio connection between at least one interfering signal source and the receiver in real time by coupling the at least one interfering signal source to the radio channel simulation block and outputting second simulation results from the radio channel simulation block, the second simulation result representing a simulation of the radio connection between the at least one interfering signal source and the receiver,
the device further storing the second simulation results in the memory, to read the stored second simulation results in real time from the memory, and adding the stored second simulation results read from the memory to the first simulation results in real time during the simulation of the radio connection between the transmitter and the receiver.

2. A device as claimed in claim 1, wherein one or more radio connections to be simulated employ a plurality of propagation paths to be simulated.

3. A device as claimed in claim 1, wherein the interfering signal sources are implemented with signal sources external to the device.

4. A device as claimed in claim 1, wherein the interfering signal sources are implemented with signal sources internal to the device.

5. A device as claimed in claim 1, wherein more than one interfering signal is implemented by using the same signal source.

6. A device as claimed in claim 1, wherein the device comprises a programmable switch for switching the signal source to be simulated at each particular time to a simulation block.

7. A device as claimed in claim 1, wherein more than one antenna element is used in at least one of the transmitter, the receiver, and interfering signal source.

8. A method of performing channel simulation comprising:
   simulating a radio connection between a transmitter and a receiver in real time by coupling the transmitter to the radio channel simulation block and outputting first simulation results from the radio channel simulation block, the first simulation results representing a simulation of the radio connection between the transmitter and the receiver:
   simulating a radio connection between at least one interfering signal source and the receiver in real time by coupling the at least one interfering signal source to the radio channel simulation block and outputting second simulation results from the radio channel simulation block, the second simulation results representing a simulation of the radio connection between the at least one interfering signal source and the receiver;
   storing the second simulation results in a memory;
   reading the stored second simulation results in real time from the memory; and
   adding the first simulation results to the second simulation results in real time during the simulation of the radio connection between the transmitter and the receiver.

9. A method as claimed in claim 8, further comprising implementing more than one interfering signal by using the same interfering signal source.

10. A method as claimed in claim 8, further comprising:
    switching the transmitter to the simulation block;
    simulating a radio connection between the transmitter and the receiver in real time;
    reading the stored second simulation results from the memory in real time; and
    combining the stored second simulation results read from the memory with the first simulation results of the radio connection between the transmitter and the receiver,
    wherein simulating a radio connection between at least one interfering signal source and the receiver in real time further comprises:
    switching a first interfering signal source to a simulation block;
    simulating a radio connection between the first interfering signal source and the receiver in real time and outputting third simulation results from the radio channel simulation block;
    storing the third simulation results associated with the first interfering signal source in the memory;
    switching a second interfering signal source to the simulation block;
    simulating a radio connection between the second interfering signal source and the receiver in real time and outputting fourth simulation results from the radio channel simulation block;
    combining the fourth simulation results associated with the second interfering signal source synchronously with the third simulation results associated with the first interfering signal source in the memory and outputting the second simulation results; and
    storing the second simulation results in the memory.

* * * * *

UNITED STATES PATENT AND TRADEMARK OFFICE
CERTIFICATE OF CORRECTION

| | |
|---|---|
| PATENT NO. | : 8,401,830 B2 |
| APPLICATION NO. | : 11/795047 |
| DATED | : March 19, 2013 |
| INVENTOR(S) | : Timo Sarkkinen |

It is certified that error appears in the above-identified patent and that said Letters Patent is hereby corrected as shown below:

In the Specifications:
Column 1, Line 3, add:

--CROSS-REFERENCE TO RELATED APPLICATION

This application is a National Phase application of International Application No. PCT/FI2006/050016, filed January 11, 2006, which claims priority based on Finnish Patent Application No. 20055016, filed January 12, 2005, which are incorporated herein by reference.

BACKGROUND OF THE INVENTION--

Column 1, line 4:

Now reads: "Field"
Should read: --Field of the Invention--

Column 2, line 47:

Now reads: "List of Figures"
Should read: --BRIEF DESCRIPTION OF THE DRAWINGS--

Column 2, line 59:

Now reads: "Description of Embodiments"
Should read: --DETAILED DESCRIPTION OF THE PREFERRED EMBODIMENTS--

Signed and Sealed this
Third Day of September, 2013

Teresa Stanek Rea
*Acting Director of the United States Patent and Trademark Office*

CERTIFICATE OF CORRECTION (continued)
U.S. Pat. No. 8,401,830 B2

Column 1, line 11:

Now reads: "Background"
Should read: --Description of the Related Art--

Column 2, line 8:

Now reads: "Brief Description"
Should read: --SUMMARY OF THE INVENTION--